Sept. 20, 1966 R. D. HOTTENSTINE 3,273,520
METHOD AND APPARATUS FOR AIR TEMPERATURE REGULATION
Filed Dec. 29, 1964 3 Sheets-Sheet 1

INVENTOR
RICHARD D. HOTTENSTINE
BY E L Kockey
AGENT

Sept. 20, 1966  R. D. HOTTENSTINE  3,273,520
METHOD AND APPARATUS FOR AIR TEMPERATURE REGULATION
Filed Dec. 29, 1964  3 Sheets-Sheet 2
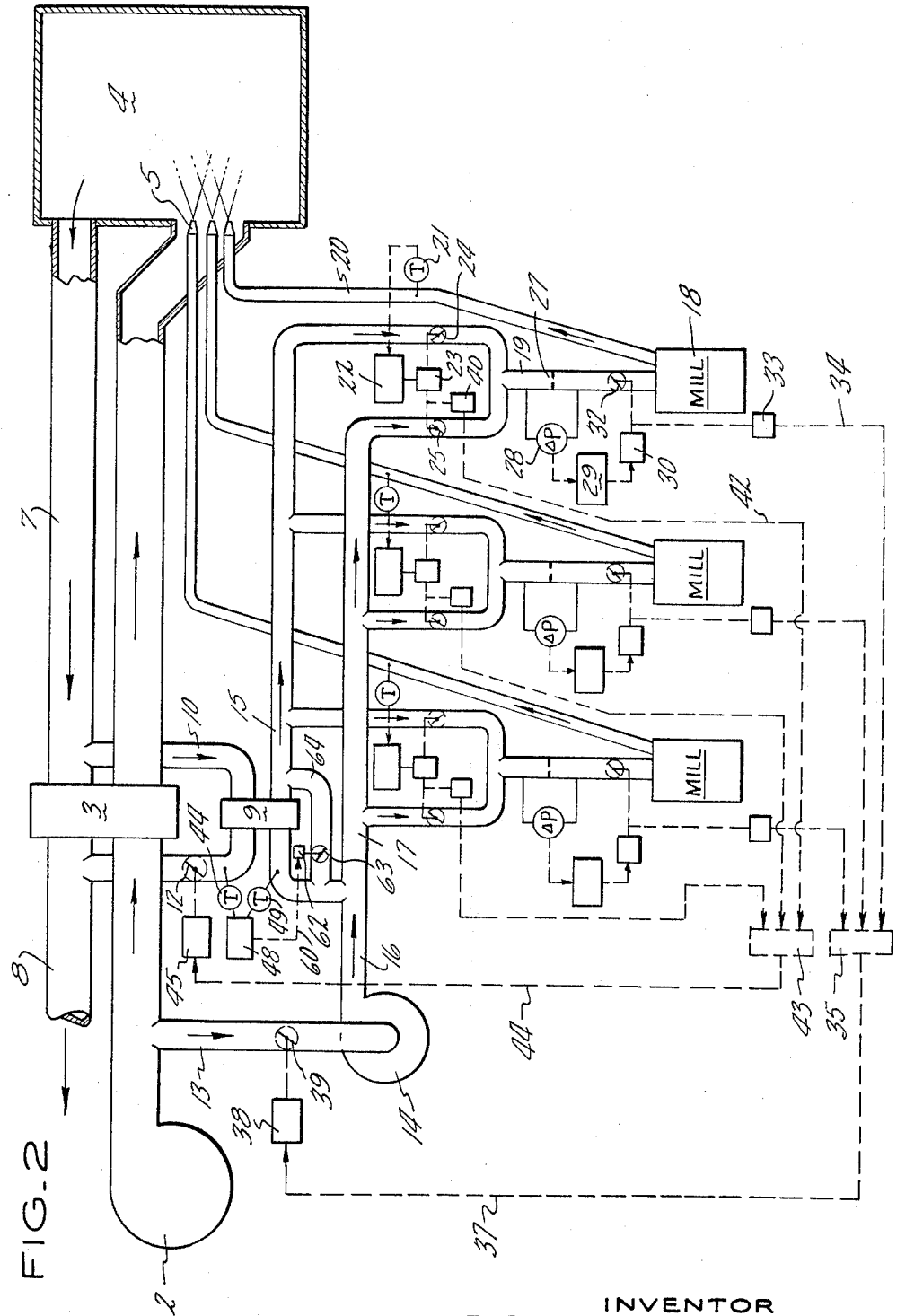
INVENTOR
RICHARD D. HOTTENSTINE
BY  E L Kockey
AGENT

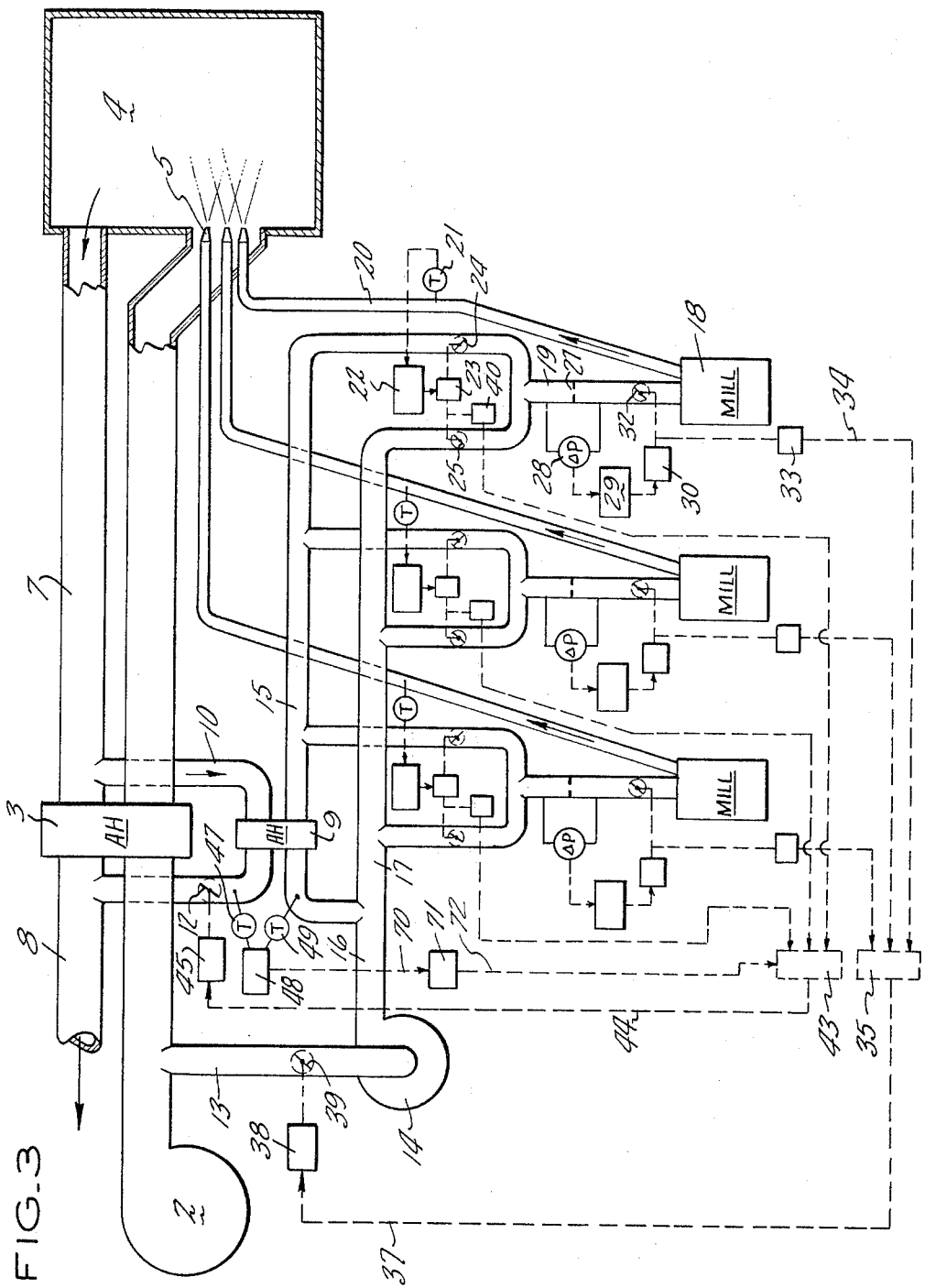

United States Patent Office 3,273,520
Patented Sept. 20, 1966

3,273,520
METHOD AND APPARATUS FOR AIR
TEMPERATURE REGULATION
Richard D. Hottenstine, Windsor, Conn., assignor to
Combustion Engineering, Inc., Windsor, Conn., a
corporation of Delaware
Filed Dec. 29, 1964, Ser. No. 421,967
11 Claims. (Cl. 110—56)

This invention relates to a pulverized fuel firing system for a vapor generator and in particular to a method and apparatus for heating and controlling primary air to the pulverizers.

Vapor generators are frequently fired with pulverized coal. When coal is pulverized for these purposes, it is important that it be simultaneously dried to a desired degree. If insufficient drying is obtained, failure of ignition in the furnace may occur with consequent furnace explosions. On the other hand, if too much drying is obtained premature ignition occurs with combustion occurring on or in the burner nozzle leading to deterioration of the burners and occasional explosions in the burner piping pulverizer. Proper drying is generally assured by controlling a hot and cold air flow to the pulverizer so that a preselected air temperature is leaving the pulverizer. The preselected temperature varies depending on the type coal being burned running usually in the order of 160° F.

The air flow quantity through the mill must be maintained at such a value that it is effective in sweeping the coal from the mill and in conveying the coal through the pipes without settling of the pulverized coal particles. This total air flow may either be maintained at a constant value or may be varied in proportion to the fuel loading of the pulverizer.

Efficiency of operation is also of considerable importance in vapor generators. Generally speaking the lower the exit gas temperature, or in other words the more heat which is extracted from the flue gases, the greater the efficiency of the unit. This low exit gas temperature is obtained by passing the hot flue gases in heat exchange relation with the incoming air to preheat the air. Maximum efficiency may be obtained when the maximum amount of incoming air is passed in heat exchange relation with the flue gases. Conversely, any air which is supplied to the furnace which bypasses the air heater has a detrimental effect on the efficiency of a vapor generator.

Excessive cooling of the flue gases however creates corrosion difficulties in the air heater and duct work due to the condensation of sulfur trioxide and formation of sulfuric acid. During certain phases of operation therefore maximum efficiency of the vapor generator is sacrificed by maintaining a high exit gas temperature in order to avoid corrosion problems.

It is of primary importance in the operation of a vapor generator to maintain proper drying conditions so that proper combustion may be obtained. The efficiency of the unit is also important but should be sacrificed when required in favor of safe operation of the pulverizers and burners. The efficiency of the unit should also be maintained at a maximum value which is consistent with the corrosion problems that occur due to low exit gas temperature.

In my invention a control system for the supply of primary air to the pulverizers is controlled so that proper operation of the pulverizers is first taken care of, and maximum efficiency of the vapor generator is thereafter obtained consistent with cold end air heater protection. Air is supplied to the pulverizers through two flow paths. One of these is a hot air path which passes through a primary air heater, the other being cold tempering air which is independent of the air heater. The total flow of air through each pulverizer is controlled in accordance with a preselected value. A proportion of hot and cold air to each pulverizer is controlled in accordance with the temperature leaving the pulverizer. The amount of cold or tempering air being supplied to each pulverizer is sensed and the pulverizer with the minimum tempering air requirement is determined. The flow of hot gas through the primary air heater is then regulated so as to obtain a proper hot air temperature which results in a minimum flow of cold tempering air to the mills and therefore a minimum amount of cold air bypassing the air heater.

It is an object of my invention to supply a control system for a pulverized fuel system which is primarly responsive to supply ideal operating conditions for the pulverizers and burners.

It is a further object to supply a control system which results in optimum vapor generator efficiency.

It is a further object to supply a control system which will sacrifice vapor generator efficiency when required and operate to maintain cold end protection of the primary air heater.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawings wherein:

FIGURE 2 is a similar schematic diagram wherein air bypass is used for cold end protection of the primary air heater; and FIGURE 3 is a similar schematic diagram wherein cold end protection of the primary air heater is effected by regulating the amount of cold air passing through the tempering air supply to the mills.

Figure 1:
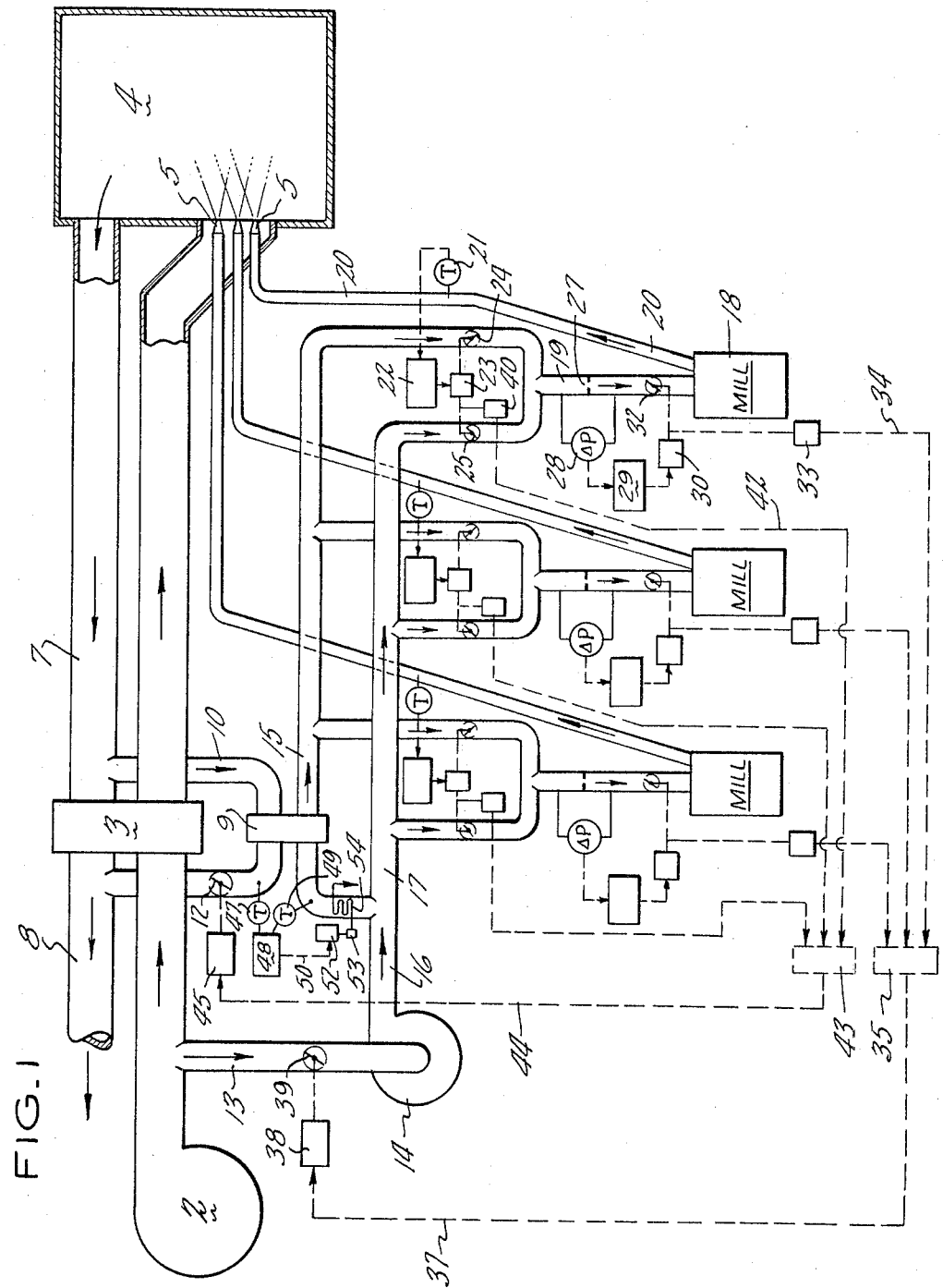
FIGURE 1 is a schematic diagram of a pulverized fuel system used in conjunction with a vapor generator according to my invention illustrating a steam air heater being used for cold end protection of the primary air heater.

In the illustration of FIGURE 1 forced draft fan 2 supplies air, a portion of which passes through the secondary air heater 3 as secondary air, to the furnace 4. This air is used as combustion supporting air for the fuel being burned in burners 5 with the combustion products passing out through gas pass 7. Secondary air heater 3 is located in this gas pass 7 and operates to cool the gases passing through gas duct 8. Also located in the secondary gas pass 7 is primary air heater 9 which is supplied by the primary air heater gas duct 10. The proportion of flue gases passing through the primary air heater 9 may be regulated by manipulation of the primary air heater gas damper 12.

Primary air is also supplied by the forced draft fan 2 passing through air duct 13, and having its pressure increased by booster fan 14. A portion of this air passing through the primary air heater 9 into the hot air duct 15 while the remainder of the air passes independent of the air heater through cold air duct 17.

The air is supplied from these ducts to a plurality of pulverizers 18. The air to each pulverizer is combined and passed through mixed air duct 19 into the pulverizer 18 where it is combined with the pulverized fuel and passes out through the fuel pipe 20. The pulverized fuel is suspended in the air and conveyed through these pipes to the burners 5 for combustion in the furnace of the vapor generator.

A temperature sensing device 21 is located to determine the temperature of the fuel air mixture leaving the pulverizer. A signal is transmitted from this temperature sensing device to controller 22 which operates to maintain a preselected temperature value. This controller does this through operator 23 which regulates the hot air damper 24 and the cold air damper 25 to proportion the flow of hot and cold air so as to maintain the desired temperature leaving the pulverizer.

Orifice plate 27 is located in the mixed air line 19 with a pressure difference transmitter 28 being located to determine the pressure drop of air flow through the orifice, thereby giving an indication of the air flow through the mill. Due to the large temperature differences which occur at this location, temperature compensation is recommended. This transmitter sends a signal to controller 29 which activates the operator 30. This in turn operates the air flow control damper 32 on the particular mill so as to maintain a predetermined air flow value through the mill.

Controller 33 is operative to determine the position of the corresponding air flow control damper 32. A signal 34, which represents the control damper position, is sent from each pulverizer to the selecting controller 35. This controller selects the pulverizing having the air flow control damper most nearly open and emits a signal indicating the damper position through control line 37 to controller 38. This operates the air flow control damper 39 to maintain the selected air flow damper 32 in a preselected nearly wide open position. Instead of operating through the control damper 39 this controller could operate on booster fan speed or inlet vanes as desired. Such an alternate would be more effective in decreasing the power requirements of the vapor generator. The control damper 39 operating in this manner is effective to maintain the air pressure in the primary air supply duct 16 at a minimum pressure consistent with the air flow requirements of the pulverizers. Although this operation of damper 39 is not essential, it will in some cases save auxiliary power and it will also decrease air heater leakage in the primary air heater 9.

Optimum efficiency of operation of the primary air heater can be accomplished when a maximum amount of primary air passes through the primary air heater with the minimum amount passing through the cold air duct 17. Accordingly, the gas flow through the primary air heater is controlled in such a manner that the temperature of the hot air passing through the hot air duct 15 is sufficiently high for satisfactory mill drying but not so high as to require excessive tempering air. In order to achieve this the flow of tempering air to each pulverizer is sensed. This may be accomplished by the use of a flow meter, or by detecting the position of the cold air damper 25. Accordingly the position of the cold air damper 25 is determined by controller 40 for each pulverizer. A control signal indicating this position is sent through control line 42 to controller 43 from each pulverizer. This controller selects the pulverizer having the lowest cold air flow (damper most nearly closed) and is operative to maintain the selected cold air damper in a preselected position which is almost closed. This is accomplished by emitting a control signal through control line 44 to the controller 45 which operates the gas flow control damper 12. The gas flow through the primary air heater 9 is thereby regulated which in turn affects the temperature of the hot air in the hot air duct 15. This change in hot air is reflected in the air temperature leaving the mill and sensed by the temperature sensing device 21 which in turn readjusts the position of the hot air control damper 24 and cold air control damper 25. Accordingly, the flow of hot gas through the air heater is regulated so that a minimum amount of coil air passes through the cold air duct 17.

In operation this control system must, of course, contend with a particular air heater which has been selected. The efficacy of this system can best be examined by considering several possible operating conditions.

First, assume that at a particular operating condition the gas temperature leaving the secondary air heater is higher than that leaving the primary air heater. It would appear in this condition that an increased boiler efficiency could be obtained by increasing the gas flow through the primary air heater. However, the primary air heater is operating to supply the required heat to a particular required air flow for the mills. This primary air system is therefore not capable of handling additional heat and is already receiving all the heat which it needs or can use. Consequently, my invention is yielding the optimum efficiency.

Second, assume that the secondary air heater requires cold end protection while the primary air heater does not. In such a situation it would appear desirable to pass a higher proportion of the gas flow through the secondary air heater to increase the exit gas temperature. However, the primary air heater is operating to supply the required heat for mill drying and the gas flowing through the primary air heater cannot be decreased without sacrificing pulverizer and burner performance. Therefore, it is again shown that my invention operates to yield optimum performance conditions.

There may well be conditions in which the cold end of the primary air heater is below the condensation temperature of sulfur trioxide. In such a situation it would be desirable to increase the cold end temperature of this air heater, but only if satisfactory performance of the pulverizers and burners can be maintained.

One method of achieving this result is illustrated in FIGURE 1 where temperature transmitter 47 senses the gases leaving the primary air heater and sends a corresponding control signal to controller 48. Temperature transmitter 49 senses the temperature of the air entering the primary air heater and sends a signal representative of this temperature to controller 48. Controller 48 averages these temperatures to determine the average cold end temperature of the air heater and compares this average temperature to a preselected value. If the average temperature is below the preselected value the control signal passes through control line 50 to controller 52. This operates steam valve 53 admitting steam to the heating coils 54. This increases the temperature of the air entering the primary air heater, and increases the temperature of the air leaving the air heater to a lesser degree. Because of the higher air temperature, less heat is transferred from the gas in the primary air heater and the gas temperature leaving the air heater also increases. Despite the fact that there is less heat taken from the gas, the primary air temperature is hotter due to the steam air heating and accordingly the tempering air flow would tend to increase in order to maintain the same mill temperature. As previously described this system operates to move the gas flow damper 12 decreasing the gas flow in the air heater to obtain the preselected position of the cold air damper 25. This system is automatically adjusted until the average cold end temperature of the primary air heater has reached the preselected value.

An alternate method of obtaining the cold end protection required is illustrated in FIGURE 2 where again temperature transmitters 47 and 49 operate in conjunction with controller 48 to compare the actual cold end temperature with the preselected value. When the actual temperature is below the preselected value, the control signal is passed through control line 60 to controller 62. This operates air bypass damper 63 which is located in the air bypass duct 64. This decrease in air flow through the air heater decreases the air heater efficiency resulting in a lower hot air temperature to the mills. In order to maintain the mill air temperature the tempering air damper 25 is closed down and the previously described control system operates to open the primary air heater gas damper 12. The increased gas flow raises the gas temperature leaving the air heater with controller 48 continuing to adjust the system until the preselected cold end temperature has been attained.

In the embodiment of my invention illustrated in FIGURE 3, the general control system is the same as that described in reference to FIGURE 1. Temperature transmitters 47 and 49 again operate through controller 48 to compare the actual cold end temperature with a preselected value. When the actual temperature is below the preselected value, the control signal is emitted through control line 70 to controller 71 which operates to establish a new desired minimum position of the cold air dampers 25. The control signal representative of this desired position is emitted through control line 72 to controller 43. Accordingly, the control signal passing through control line 44 operates to adjust the gas flow damper 12 to maintain the cold air flow damper 25 in the newly selected position. This increase in cold air flow to the mills decreases the hot air flow through the primary air heater so that the efficiency of the air heater is decreased. Accordingly, the control system will operate to open the gas flow damper 12 so that the gas temperature leaving the primary air heater is increased. Controller 48 will continue to act upon this control system until the average cold end temperature reaches the preselected value.

It can thus be seen that my control system operates in such a manner that the prime concern is the safe operation of the pulverizer and steam generator furnace. The cold end protection of the primary air heater is accomplished only in such a manner as will not reduce the safety of the steam generator operation.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A pulverized fuel system for a vapor generator having a furnace, burners for burning a pulverized fuel in the furnace, a gas pass for conveying convection products from said furnace, a secondary air heater located in said gas pass, and a means for conveying secondary air through said secondary air heater and thence to the furnace to support combustion therein comprising: a plurality of pulverizers; a primary air heater located in said gas pass, said air heater being in parallel relation with said secondary air heater with respect to gas flow; means for passing primary air through said primary air heater to the mills for fuel drying and thence to the burners; means for supplying tempering air to the pulverizers; means for controlling said tempering air flow in response to the temperature leaving each pulverizer; means for selecting the pulverizer having the lowest tempering air flow; means for regulating the gas flow through the primary air heater in accordance with the tempering air flow supplied to the selected pulverizer, whereby said tempering air flow may be maintained at a minimum value.

2. A pulverized fuel system for a vapor generator having a furnace, burners for burning a pulverized fuel in the furnace, a gas pass for conveying convection products from said furnace, a secondary air heater located in said gas pass, and a means for conveying secondary air through said secondary air heater and thence to the furnace to support combustion therein comprising: a plurality of pulverizers; a primary air heater located in said gas pass, said air heater being in parallel relation with said secondary air heater with respect to gas flow; means for supplying hot primary air to the pulverizers through said primary air heater; means for supplying cold tempering air to the pulverizers; means for regulating the hot air and cold tempering air flowing to each mill in accordance with the temperature of the air leaving the pulverizer; sensing means associated with each pulverizer responsive to the flow of tempering air to each pulverizer to indicate the quantity of cold tempering air being supplied; control means for selecting the sensing means which indicates the lowest tempering air flow; means responsive to said control means to regulate the gas flow through the primary air heater to keep said selected tempering air flow at a preselected value.

3. A pulverized fuel system for a vapor generator having a furnace, burners for burning a pulverized fuel in the furnace, a gas pass for conveying convection products from said furnace, a secondary air heater located in said gas pass, and a means for conveying secondary air through said secondary air heater and thence to the furnace to support combustion therein comprising: a plurality of pulverizers; a primary air heater located in said gas pass, said air heater being in parallel relation with said secondary air heater with respect to gas flow; means for supplying hot primary air to the pulverizers through said primary air heater; means for supplying cold tempering air to the pulverizers; control means for regulating the hot air and cold tempering air flowing to each mill in accordance with the temperature of the air leaving the pulverizer; sensing means responsive to the position of the control means to indicate the relative quantity of cold air being supplied; second control means for selecting the control means which indicates the lowest proportion of cold air flow; means responsive to said second control means to regulate the gas flow through the primary air heater to keep the selected control means at a preselected position.

4. A pulverized fuel system for a vapor generator having a furnace, burners for burning a pulverized fuel in the furnace, a gas pass for conveying convection products from said furnace, a secondary air heater located in said gas pass, and means for conveying secondary air through said secondary air heater and thence to the furnace to support combustion therein comprising: a plurality of pulverizers; a primary air heater located in said gas pass, said air heater being in parallel relation with said secondary air heater with respect to gas flow; means for establishing a flow of hot air to the pulverizers including passing the air through the primary air heater; means for establishing a flow of cold air to the pulverizers; means to regulate the pressure of the cold air supplied to the pulverizers; means responsive to the temperature leaving the pulverizers to control the proportion of hot and cold air entering each pulverizer; first means for controlling the total air flow through each pulverizer to maintain the total air flow through each pulverizer at a preselected value; second means responsive to said first means selecting the particular first means which indicates a maximum air pressure requirement; and means responsive to said second means to effect the regulation of said air pressure in accordance with the requirement of the selected pulverizer; sensing means responsive to the cold air flow to each pulverizer; means operative to select the pulverizer having the minimum cold air flow; and means responsive to the last named means to regulate gas flow through the primary air heater to maintain a preselected value of cold air flow to the selected pulverizer.

5. An apparatus as in claim 1 including also means for heating the primary air being conveyed to the primary air heater; and means responsive to the average temperature of the air entering said primary air heater and the gas leaving said primary air heater for controlling said heating means to maintain said average at a preselected value.

6. An apparatus as in claim 1 having also means for bypassing cold primary air around said primary air heater into said hot primary air supply; means for determining the average temperature of the hot gas leaving said primary air heater and the cold air entering said primary air heater; and means responsive to said average temperature to control said bypassed air flow to maintain said average at a preselected value.

7. An apparatus as in claim 1 including also means for determining the average of the gas temperature leaving said primary air heater and the air temperature entering said primary air heater; means for adjusting the minimum cold air flow to the selected pulverizer to maintain said average temperature at a preselected value.

8. In a vapor generating and heating unit having a combustion zone wherein pulverized fuel is burned, and a plurality of pulverizers, the method of operation comprising: conveying secondary air to a combustion zone; introducing and burning fuel in the combustion zone forming combustion products; passing the combustion products in heat exchange relation with the fluid to be vaporized and heated, cooling the combustion products; dividing the combustion products into parallel major and minor flow portions; passing secondary air in heat exchange relation with the major flow portion and thence to the combustion zone as combustion supporting air; creating a flow of primary air and passing a first portion thereof in heat exchange relation with the minor flow portion of combustion products, thereby establishing a hot air stream; passing a second portion of the flow of primary air independent of the heat exchange relation establishing the cold air stream; supplying a plurality of pulverizers with fuel to be pulverized, cold air from the cold air stream and hot air from the hot air stream; conveying the pulverized fuel from each pulverizer to the combustion zone, suspended in the air flow; regulating the supply of hot and cold air to each pulverizer to maintain a preselected total air flow and a preselected temperature of the mixture leaving the pulverizer; and regulating the quantity of the minor flow portion of the combustion products being passed in heat exchange relation with the first portion of the primary air flow in response to the flow quantity of a second cold primary air portion, and in such a manner as to maintain the second cold primary air portion at a minimum flow quantity consistent with satisfactory temperatures of the mixtures leaving the pulverizers.

9. In a vapor generating and heating unit having a combustion zone wherein pulverized fuel is burned, and a plurality of pulverizers, the method of operation comprising: conveying secondary air to a combustion zone; introducing and burning fuel in the combustion zone forming combustion products; passing the combustion products in heat exchange relation with the fluid to be vaporized and heated, cooling the combustion products; dividing the combustion products into parallel major and minor flow portions; passing secondary air in heat exchange relation with the major flow portion and thence to the combustion zone as combustion supporting air; creating a flow of primary air and passing a first portion thereof in heat exchange relation with the minor flow portion of combustion products, thereby establishing a hot air stream; passing a second portion of the flow of primary air independent of the heat exchange relation establishing the cold air stream; supplying a plurality of pulverizers with fuel to be pulverized, cold air from the cold air stream and hot air from the hot air stream; conveying the pulverized fuel from each pulverizer to the combustion zone, suspended in the air flow; regulating the supply of hot and cold air to each pulverizer to maintain a preselected total air flow through the pulverizer and a preselected temperature of the mixture leaving the pulverizer; sensing the amount of cold air flowing to each active pulverizer; selecting the pulverizer having the minimum amount of cold air flowing thereto; and regulating the quantity of the minor flow portion of the combustion products being passed in heat exchange relation with the first portion of the primary air flow to maintain the amount of cold air flowing to the selected pulverizer at a preselected value.

10. A method as in claim 9 including: sensing the temperature of the minor flow portion of combustion products after they have passed in heat exchange relation with the first portion of the flow of primary air; sensing the temperature of this first portion with the flow of primary air before it has passed in heat exchange relation with the minor flow portion of the combustion products; determining the average of these two sensed temperatures; and adjusting the preselected value of cold air flowing to the selected pulverizer to maintain said average temperature at a preselected value.

11. A method as in claim 9 including: sensing the temperature of the minor flow portion of combustion products after they have passed in heat exchange relation with the first portion of the flow of primary air; sensing the temperature of this first portion of the flow of primary air before it has passed in heat exchange relation with the minor flow portion of the combustion products; determining the average of these two sensed temperatures; and varying the temperature of the first portion of the flow of primary air entering into heat exchange relationship with the minor flow portion of the combustion products to maintain said average temperature at a preselected value.

References Cited by the Examiner

UNITED STATES PATENTS 3,117,538   1/1964   Bover et al. _____ 110—106 X

KENNETH W. SPRAGUE, *Primary Examiner.*